(12) United States Patent
Morris et al.

(10) Patent No.: US 8,958,487 B2
(45) Date of Patent: Feb. 17, 2015

(54) POWER LINE COMMUNICATION TRANSMITTER WITH AMPLIFIER CIRCUIT

(75) Inventors: Micheal D. Morris, Brainerd, MN (US); Dale Scott Pelletier, Crosslake, MN (US)

(73) Assignee: Landis+Gyr Technologies, LLC, Pequot Lakes, MN (US)

( * ) Notice: Subject to any disclaimer, the term of this patent is extended or adjusted under 35 U.S.C. 154(b) by 375 days.

(21) Appl. No.: 13/335,399

(22) Filed: Dec. 22, 2011

(65) Prior Publication Data

US 2013/0163683 A1 Jun. 27, 2013

(51) Int. Cl.
*H04B 3/54* (2006.01)

(52) U.S. Cl.
USPC ........................................ 375/257

(58) Field of Classification Search
USPC ................................. 375/257, 238
See application file for complete search history.

(56) References Cited

U.S. PATENT DOCUMENTS

| | | | |
|---|---|---|---|
| 5,581,229 A | 12/1996 | Hunt | |
| 6,104,707 A * | 8/2000 | Abraham | 370/295 |
| 6,154,488 A | 11/2000 | Hunt | |
| 6,177,884 B1 | 1/2001 | Hunt et al. | |
| 6,998,963 B2 | 2/2006 | Flen et al. | |
| 7,102,490 B2 | 9/2006 | Flen et al. | |
| 7,145,438 B2 | 12/2006 | Flen et al. | |
| 7,180,412 B2 | 2/2007 | Bonicatto et al. | |
| 7,184,861 B2 | 2/2007 | Petite | |
| 7,209,840 B2 | 4/2007 | Petite et al. | |
| 7,224,740 B2 | 5/2007 | Hunt | |
| 7,236,765 B2 | 6/2007 | Bonicatto et al. | |
| 7,346,463 B2 | 3/2008 | Petite et al. | |
| 7,432,824 B2 | 10/2008 | Flen et al. | |
| 7,443,313 B2 | 10/2008 | Davis et al. | |
| 7,468,661 B2 | 12/2008 | Petite et al. | |
| 7,706,320 B2 | 4/2010 | Davis et al. | |
| 7,738,999 B2 | 6/2010 | Petite | |
| 7,742,393 B2 | 6/2010 | Bonicatto et al. | |
| 7,774,530 B2 | 8/2010 | Haug et al. | |
| 7,791,468 B2 | 9/2010 | Bonicatto et al. | |
| 7,877,218 B2 | 1/2011 | Bonicatto et al. | |
| 7,978,059 B2 | 7/2011 | Petite et al. | |
| 8,144,816 B2 | 3/2012 | Bonicatto et al. | |
| 8,144,820 B2 | 3/2012 | Bonicatto | |
| 8,194,789 B2 | 6/2012 | Wolter et al. | |
| 8,238,263 B2 | 8/2012 | Kohout et al. | |
| 2002/0161536 A1 * | 10/2002 | Suh et al. | 702/62 |
| 2006/0038662 A1 | 2/2006 | White et al. | |
| 2006/0226958 A1 * | 10/2006 | Baril et al. | 340/310.11 |
| 2007/0188227 A1 * | 8/2007 | Maejima | 330/251 |
| 2008/0304595 A1 | 12/2008 | Haug et al. | |
| 2010/0289578 A1 | 11/2010 | Cao | |

(Continued)

*Primary Examiner* — Kevin Kim
(74) *Attorney, Agent, or Firm* — Crawford Maunu PLLC

(57) ABSTRACT

In one embodiment, a transmitter circuit is provided for data transmission from endpoint devices to collector devices over power distribution lines. The transmitter includes an amplifier circuit configured to receive and convert a first data signal to a pulse density modulation (PDM) encoded signal using high frequency pulses that introduce high frequency components. A low-pass filter of the transmitter is configured to filter the high frequency components of the PDM encoded signal to produce a second data signal, which is an amplification of the first data signal. A coupling circuit of the transmitter is configured to communicatively couple the second data signal from the low-pass filter to the power distribution lines. The coupling circuit filters the frequency of the AC and prevents high voltage of the power distribution lines from damaging the transmitter.

22 Claims, 5 Drawing Sheets

(56) References Cited

U.S. PATENT DOCUMENTS

| | | |
|---|---|---|
| 2011/0051820 A1 | 3/2011 | Fornage |
| 2011/0121952 A1 | 5/2011 | Bonicatto et al. |
| 2011/0176598 A1 | 7/2011 | Kohout et al. |
| 2011/0200123 A1 | 8/2011 | Swarztrauber et al. |
| 2011/0206140 A1 | 8/2011 | Schwager et al. |
| 2011/0218686 A1 | 9/2011 | Mchann, Jr. et al. |
| 2011/0249678 A1 | 10/2011 | Bonicatto et al. |
| 2012/0057592 A1 | 3/2012 | Zeppetelle et al. |
| 2012/0076212 A1 | 3/2012 | Zeppetelle et al. |
| 2012/0084559 A1 | 4/2012 | Bonicatto |
| 2012/0106664 A1 | 5/2012 | Bonicatto et al. |

\* cited by examiner

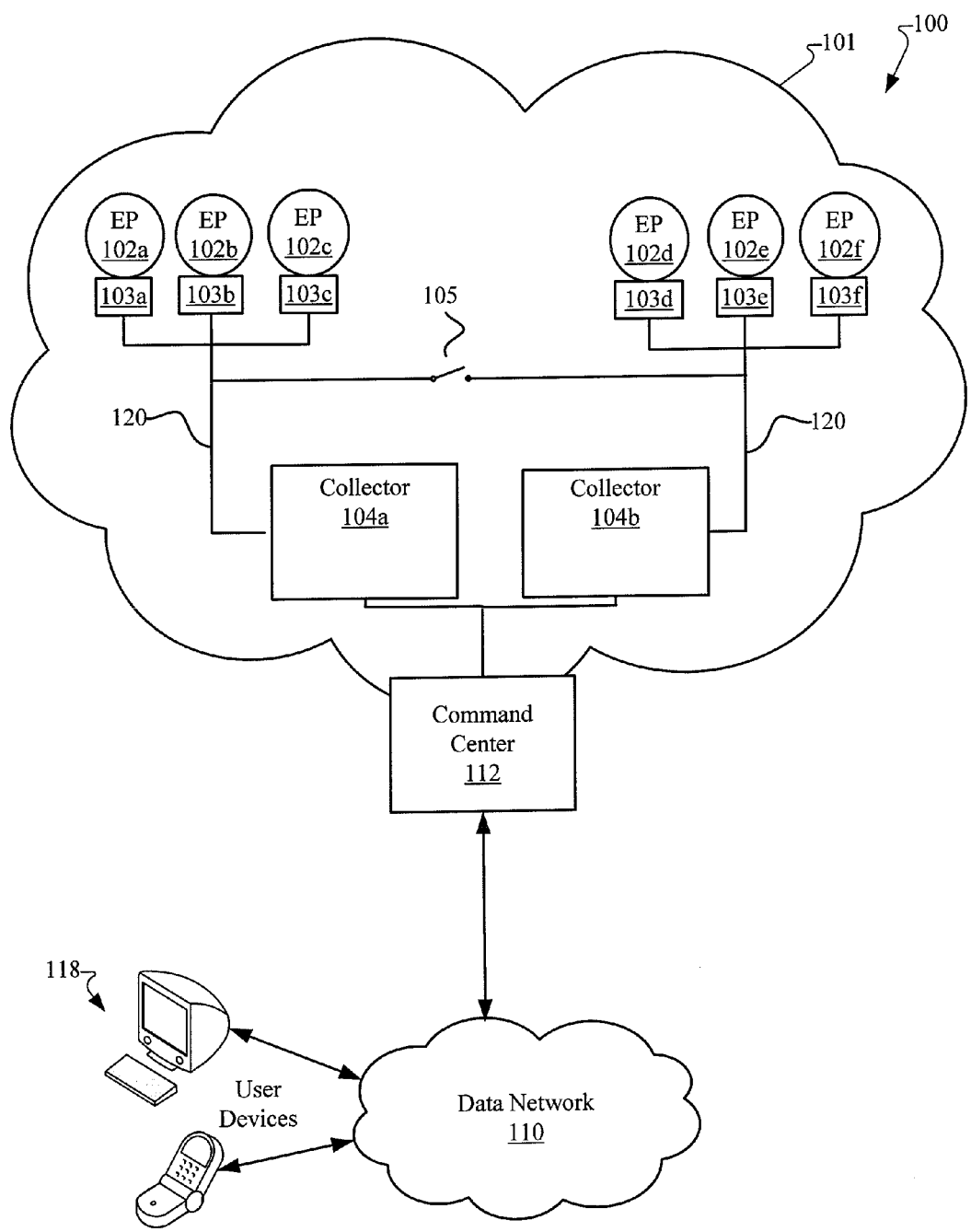
FIG. 1-A

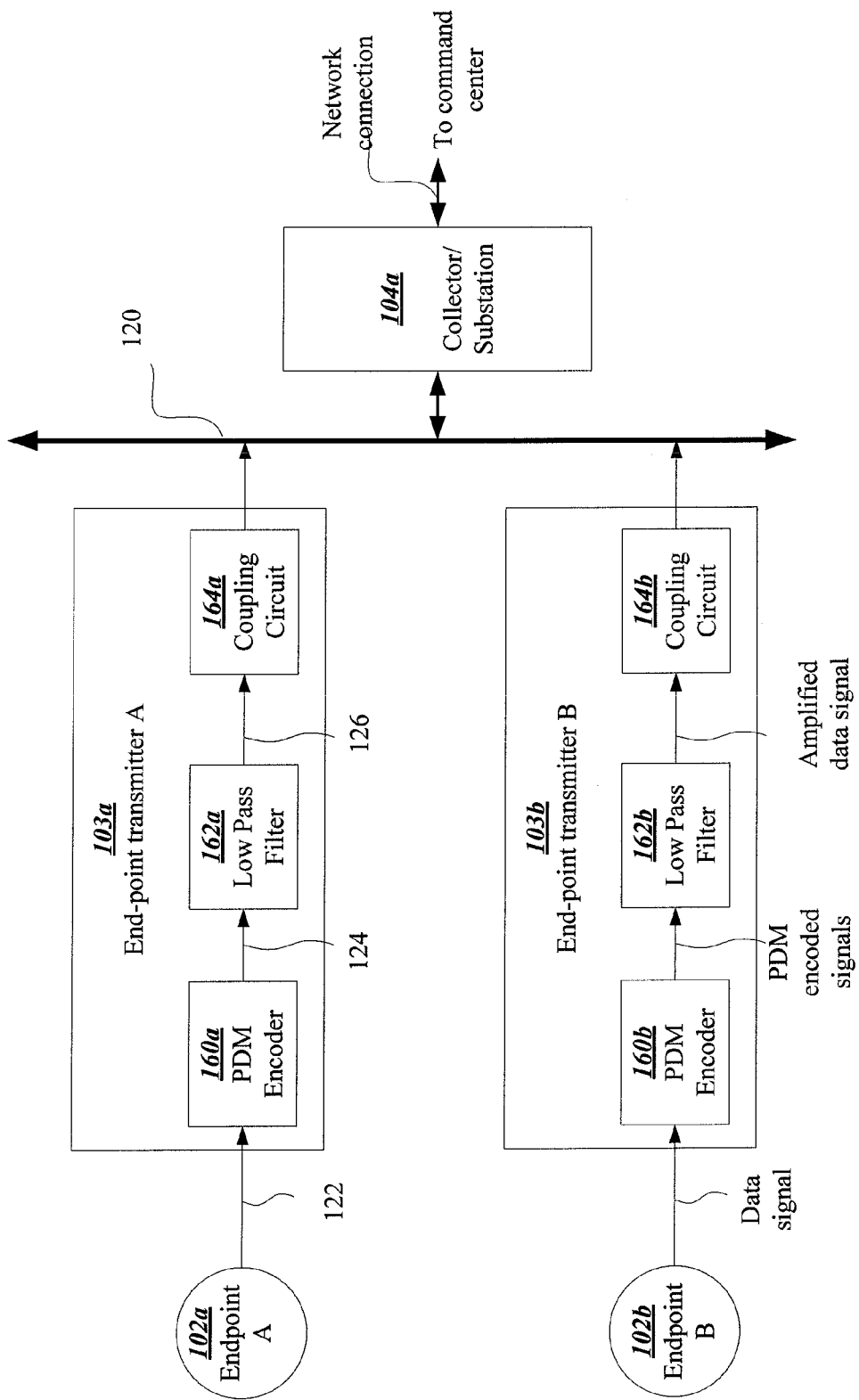
FIG. 1-B

United States Patent US 8,958,487 B2

POWER LINE COMMUNICATION TRANSMITTER WITH AMPLIFIER CIRCUIT

BACKGROUND

Service providers utilize distributed networks to provide services to customers over large geographic areas. For instance, power companies use power distribution lines to carry power from one or more generating stations (power plants) to residential and commercial customer sites alike. The generating stations use alternating current (AC) to transmit power over long distances via the power distribution lines. Long-distance transmission can be accomplished using a relatively high voltage. Substations located near the customer sites provide a step-down from the high voltage to a lower voltage (e.g., using transformers). Power distribution lines carry this lower-voltage AC from the substations to the endpoint devices customer sites.

Communications providers may utilize a distributed communications network to provide communications services to customers. Similarly, power companies utilize a network of power lines, meters, and other network elements to provide power to customers throughout a geographic region and to receive data from the customer locations (e.g., including, but not limited to, data representing metered utility usage). A system can provide these reporting functions using a set of data-collecting devices (collectors) that are designed to communicate with nearby endpoint devices. However, data communication between a command center, collectors and many thousands of endpoint devices over power distribution lines can be a particularly challenging issue. The sheer number of endpoint devices contributes to a host of issues including, but not limited to synchronization, communication bandwidth, and cost concerns such as power efficiency of the devices. Power efficiency may particularly be a concern for endpoint devices configured to continue communication of data in response to power outages.

SUMMARY

The present disclosure is directed to systems and methods for use with coordinated communications between devices and over power distribute lines. These and other aspects of the present disclosure are exemplified in a number of illustrated implementations and applications, some of which are shown in the figures and characterized in the claims section that follows.

In one embodiment, a transmitter circuit provides for data transmission from endpoint devices to collector devices over power distribution lines. The transmitter includes an amplifier circuit configured to receive and convert a first data signal to a pulse density modulation (PDM) encoded signal using high frequency pulses that introduce high frequency components. A low-pass filter of the transmitter is configured to filter the high frequency components of the PDM encoded signal to produce a second data signal, which is an amplification of the first data signal. A coupling circuit of the transmitter is configured to communicatively couple the second data signal from the low-pass filter to the power distribution lines. The coupling circuit filters the AC frequency of the power distribution lines and prevents high voltage of the power distribution lines from damaging the transmitter circuit.

In another embodiment, a method is provided for communicating data over power distribution lines using AC. A first data signal is amplified by a processing circuit by converting the first data signal to a PDM encoded signal, and filtering high frequency components of the PDM encoded signal to produce a second amplified data signal. The amplified data signal is communicated from the processing circuit to the power distribution lines, while filtering the power-line frequency and preventing high voltage of the power distribution lines from damaging the processing circuit.

The above summary is not intended to describe each illustrated embodiment or every implementation of the present disclosure. The figures and detailed description that follow, including that described in the appended claims, more particularly describe some of these embodiments.

BRIEF DESCRIPTION OF FIGURES

Various example embodiments may be more completely understood in consideration of the following detailed description in connection with the accompanying drawings, in which:

FIG. 1A is a block diagram of a network environment having endpoints configured for transmission of data over a power distribution network, consistent with one or more embodiments of the present disclosure;

FIG. 1B is a block diagram of a transmitter circuit arranged in the network environment shown in FIG. 1A, consistent with one or more embodiments of the present disclosure;

Figure 2:
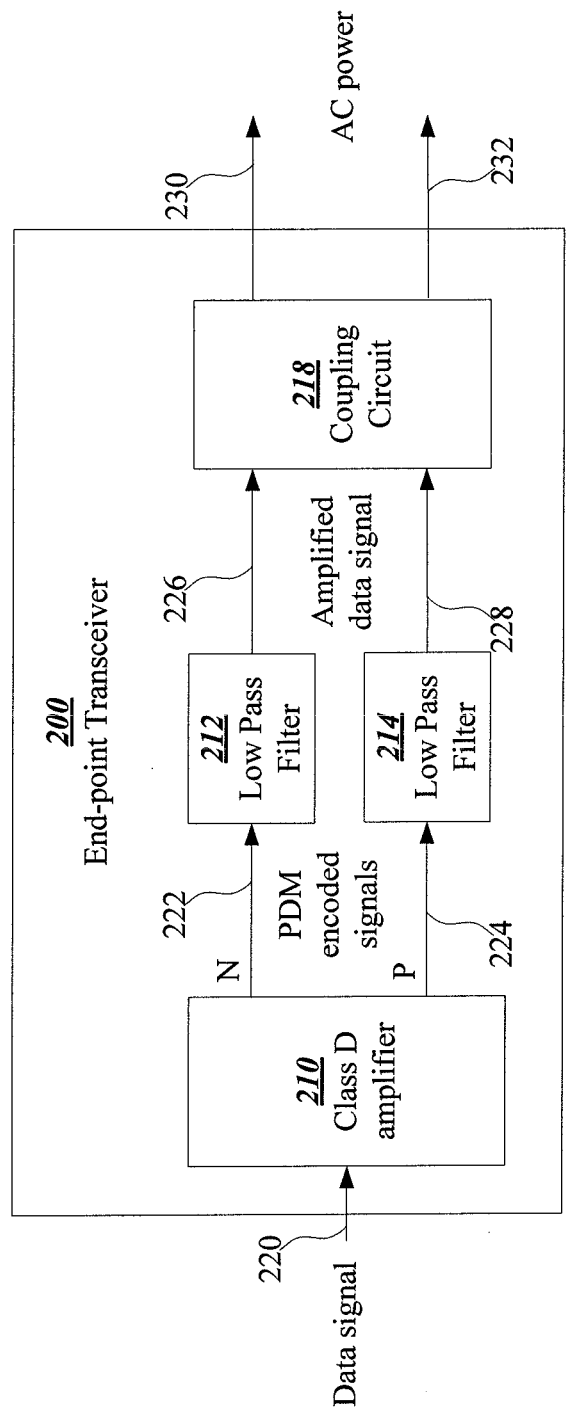
FIG. 2 is a block diagram of an endpoint transceiver circuit, consistent with one or more embodiments of the present disclosure.

While the disclosure is amenable to various modifications and alternative forms, examples thereof have been shown by way of example in the drawings and will be described in detail. It should be understood, however, that the intention is not to limit the disclosure to the particular embodiments shown and/or described. On the contrary, the intention is to cover all modifications, equivalents, and alternatives falling within the spirit and scope of the disclosure.

DETAILED DESCRIPTION

Aspects of the present disclosure are believed to be applicable to a variety of different types of devices, systems, and arrangements for coordinating communications between multiple levels of devices using power distribution lines as communication carriers. While the present disclosure is not necessarily limited to such applications, various aspects of the disclosure may be appreciated through a discussion of various examples using this context. Example embodiments of the instant disclosure include various methods and circuits for processing and transmission of data signals. Consistent with the instant disclosure, certain embodiments are directed to transmitter circuits that may be used in endpoint devices for communicating over power distribution lines.

One or more embodiments provide a power efficient transmitter. An amplifier circuit of the transmitter converts a first data signal to a pulse-density modulation (PDM) encoded signal using high frequency pulses. PDM, is a form of modulation used to represent an analog signal in a binary digital form. In a PDM encoding, specific amplitude values of the analog signal are represented by the relative density of binary data pulses. Pulse-width modulation (PWM) is one type of PDM encoding, in which pulses are evenly spaced in time at a distance corresponding to a sampling rate or encoding frequency. The amplitude of each sample is represented by the width of the corresponding pulse. The PDM encoding allows the signal to be easily amplified in binary form. In some embodiments, the PDM encoded signal may be amplified during the PDM encoding process.

A low-pass filter of the transmitter is then used to filter the high frequency components of the PDM encoded signal to produce an amplified version of the original first data signal. A coupling circuit of the transmitter is configured to communicatively couple the amplified data signal from the low-pass filter to the power distribution lines. The coupling circuit filters the AC frequency of the power distribution lines and prevents high voltages of the power distribution lines from damaging the transmitter.

In some embodiments, the PDM encoding is performed using a Class D amplifier. A Class D amplifier is a switching amplifier, in which the output signal is either fully on or fully off This characteristic is useful in encoding binary signals, such as in PDM encoding, and significantly reduces the power consumption in comparison to a linear amplifier, which is used for amplification of analog signals.

The PDM encoding uses a pulse rate frequency that is greater than a frequency of the first data signal, which enables the low-pass filter to remove the high frequency components of the PDM encoded signal to produce an amplified version of the original data signal. Likewise, the pulse rate may also be set to be greater than the AC frequency of power distribution lines so that high-pass filtration may be used to communicate the amplified data signal to the power distribution lines while filtering the AC frequencies from the transmitter.

In some implementations, the transmitter may be configurable to use different ones of a plurality of carrier frequencies. In some embodiments, the transmitter is configured to adjust gain of the transmitter to a level suitable for a selected one of the plurality of carrier frequencies. The transmitter includes a circuit to select one of a plurality of carrier frequencies and modulate the carrier signal to encode data bits to produce the first data signal. A current sensing circuit of the transmitter is configured to sense current provided to the power distribution lines by the coupling circuit. A feedback circuit adjusts the gain of the amplifier circuit as a function of the sensed current and the selected one of the plurality of carrier frequencies.

Consistent with various embodiments of the present disclosure, the power distribution lines can carry power that is provided from one or more generating stations (power plants) to residential and commercial customer sites alike. The generating station uses AC to transmit the power long distances over the power distribution lines. Long-distance transmission can be accomplished using a relatively high voltage. Substations located near the customer sites provide a step-down from the high voltage to a lower voltage (e.g., using transformers). Power distribution lines carry this lower voltage AC from the substations to the customer sites. Depending upon the distribution network, the exact voltages and AC frequencies can vary. For instance, voltages can generally be in the range 100-480 V (expressed as root-mean-square voltage) with two commonly used frequencies being 50 Hz and 60 Hz. In the United States, for instance, a distribution network can provide customer sites with 120 V and/or 480 V, at 60 Hz.

FIG. 1A is a block diagram of a power line communication (PLC) network environment 100 in which endpoint transmitters 103 communicate data with collector units, consistent with embodiments of the present disclosure. The network environment 100 includes a service network 101 in which a plurality of endpoint devices 102a-102f are coupled (e.g., communicatively coupled) to collector units 104a, 104b. Consistent with embodiments of the present disclosure, the endpoints 102 can provide data from utility meters. For instance, data can be provided from power meters, gas meters and/or water meters, which are respectively installed in gas and water distribution networks. For ease of description the embodiments and examples are primarily described with reference to endpoints 102 as providing utility data (e.g., power) metering over a power distribution network. However, the embodiments are not so limited and it is understood that other data can also be communicated by endpoint devices as well.

Data communication over utility distribution networks is difficult due to the environment of the transmission mediums and the sheer number of endpoint devices, which contribute to a host of issues including synchronization, communication bandwidth and cost concerns. For instance, data transmitters for distribution lines must be able to handle high voltages inherently present on the power lines. For many utilities, transmission mediums are not heavily utilized for transmission of data. As such, lower frequency bandwidth is often available for transmission. In one or more embodiments, endpoint transmitters 103 are configured to take advantage of transmission in lower frequency bands, available for many utility transmission mediums, to provide an energy efficient transmission of data signals in such network. As explained with reference to FIG. 1B below, endpoint transmitters may encode low frequency data signals using high frequency PDM encoding, which allows the signals to be easily PDM decoded using low-pass filtration at a later time.

The power distribution network 100 shown in FIG. 1A may also exhibit dynamic impedance changes which may make communication difficult due to addition and removal of other endpoint devices 102, reconfiguration of the network to balance power loads (via switch 105), reconfiguration of frequency bands assigned to the transmitters, environmental factors (e.g. frost on the power lines), etc. As a result, of the impedance changes of the network, endpoint transmitters 103 may need to adjust the amplitude of signals transmitted to collectors 104. As discussed with reference to FIG. 3 below, in one or more embodiments the endpoint transmitter 103 may also be configured to detect and adjust gain of the transmitter 103 in response to impedance changes.

The endpoints 102 can be implemented to monitor and report various operating characteristics of the service network 101. For instance, in a power distribution network, meters can monitor characteristics related to power usage in the network including, e.g., average or total power consumption, power surges, power drops and load changes, among other characteristics. In gas and water distribution networks, meters can measure similar characteristics that are related to gas and water usage (e.g., total flow and pressure).

When the endpoints 102 are implemented as power meters in a power distribution network, the power meters transmit reporting data that specify updated meter information that can include measures of total power consumption, power consumption over a specified period of time, peak power consumption, instantaneous voltage, peak voltage, minimum voltage and other measures related to power consumption and power management (e.g., load information). Each of the power meters can also transmit other data, such as status data (e.g., operating in a normal operating mode, emergency power mode, or another state such as a recovery state following a power outage).

In FIG. 1, endpoints 102a-102c and 102d-102f transmit data over power distribution lines to collector units 104a, 104b, respectively. The collector units 104 can include circuitry (e.g., including one or more data processors) that is configured and arranged to communicate with the endpoints over power distribution lines. The collector units 104 can also include circuitry for interfacing with a command center 112 at a local utility office or other location. The interface to the command center 112 can be implemented using a variety of different communication networks including, but not limited to, a wide-area network (WAN) using Ethernet.

According to certain embodiments of the present disclosure, the collectors may be installed in power stations, power substations, transformers, etc. to control bidirectional communication between the command center 112 (e.g., located at a utility office) and endpoints (e.g., located at metering locations for customer sites). This messaging to the endpoints can be sent to an individual endpoint, or broadcast simultaneously to a group of endpoints or even all endpoints connected to the collectors 104. Consistent with certain embodiments the collectors 104 are built according to an industrial-grade computer specification in order to withstand the harsh environment of a substation.

In certain embodiments of the present disclosure, a collector 104 can receive data from many different endpoints 102 while storing the data in a local database. In some embodiments, a collector may take action based on the data received from the endpoints and transmit data received from the endpoints to a command center 112. For instance, in a PLC network, the command center 112 can receive data indicating that power usage is significantly higher in a particular portion of a power network than in other portions of the power network. Based on this data, the command center 112 can allocate additional resources to that particular portion of the network (i.e., load balance) or provide data specifying that there is increased power usage in the particular portion of the power network.

Consistent with certain embodiments, the command center 112 provides an interface that allows user devices 118 access to data received by the command center 112 via data network 110. For instance, the user devices 118 might be owned by a utility provider operator, maintenance personnel and/or customers of the utility provider. For instance, data identifying the increased power usage described above can be provided to a user device 118, which can, in turn, determine an appropriate action regarding the increased usage. Additionally, data identifying a time-of-use measure and/or a peak demand measure can also be provided to the user device 118. Similarly, if there has been a power outage, the command center 112 can provide data to user devices 118 that are accessible by customers to provide information regarding the existence of the outage and potentially provide information estimating the duration of the outage.

The data network 110 can be a wide area network (WAN), local area network (LAN), the Internet, or any other communications network. The data network 110 can be implemented as a wired or wireless network. Wired networks can include any media-constrained networks including, but not limited to, networks implemented using metallic wire conductors, fiber optic materials, or waveguides. Wireless networks include all free-space propagation networks including, but not limited to, networks implemented using radio wave and free-space optical networks.

Endpoint transmitters 103 may be configured to transmit data to collectors 104 using a number of different data modulation techniques, including frequency shift keying (FSK), phase shift keying (PSK, e.g., Quadrature PSK or 8PSK), multiple frequency shift keying (MFSK, e.g., 2 of 9, or 2 of 46 MFSK), Quadrature Amplitude Modulation (QAM, e.g., 16 or 256 QAM), etc. Encoded data symbols from a particular endpoint may be transmitted over one of thousands of communications channels in a PLC system. Communications channels may be allocated from various portions of spectrum over which data are transmitted. The center frequency and bandwidth of each communications channel can depend on the communications system in which they are implemented. In some implementations, multiple communication channels may use time slots to operate in one or more shared frequency bands. For instance, each endpoint can be assigned a particular channel according to an orthogonal frequency division multiple access (OFDMA) or another channel allocation technique. Channel assignments for the endpoints 102a-102c, 102d-102f that communicate with particular collectors 104a, 104b can be stored, for instance, at the command center 112 and/or the collectors 104a, 104b.

Consistent with embodiments of the present disclosure, each collector 104 can be configured to be in communication with thousands of endpoints 102, and thousands of collectors 104 can be in connection with the command center 112. For example, a single collector can be configured to communicate with over 100,000 endpoint devices and a command center can be configured to communicate with over 1,000 collectors. Thus, there can be millions of total endpoints and many thousands of endpoints can communicate to the same collector over a shared power distribution line. Accordingly, embodiments of the present disclosure are directed toward coordinating communications using carefully designed time-based protocols and considerations.

FIG. 1B is a block diagram of a transmitter circuit arranged in the network environment shown in FIG. 1A. As described above, the transmitters 103a and 103b communicate data from respective endpoints, 102a and 102b, to a corresponding collector circuit 104a using AC power distribution lines 120. Each transmitter includes an amplifier 160 configured to receive a data signal and encode received data signal using PDM encoding. The PDM encoded signals 124 are filtered by a low-pass filter configured to filter the high frequency component related to the sampling frequency of the PDM encoder. When the high frequency components of the PDM encoded signals are removed, an amplified version 126 of the original data signal 122 is produced.

The amplified data signal 126 is communicated to the power distribution lines 120 for transmission by a coupling circuit 164. The coupling circuit 164 filters the frequency of the AC power on the power distribution lines 120 and prevents high voltages of the power distribution lines 120 from damaging the low-pass filter 162 or PDM encoder 160 circuits.

The coupling circuit may be implemented, for instance, using a transformer to isolate the power distribution lines from the low-pass filter and/or amplifier. The coupling circuit includes a series capacitor implemented on the primary side of a transformer and a series capacitor on the secondary side of the transformer. The resulting transformer-capacitor circuit of the coupling circuit may be configured to provide, for instance, a band pass signal path. The band pass can be configured to pass signals in a frequency range used for communication, while also blocking the AC power line frequency from affecting the output of the amplifier. A number of different frequency ranges may be used for the band pass signal path. For instance, signal frequencies of 500 Hz-100 KHz can be used in certain, non-limiting embodiments. It has been discovered that a 2 KHz-20 KHz range surprisingly provides quality communication channels over long distances.

FIG. 2 is a block diagram of an endpoint transceiver circuit 200 that may be used to implement the transmitters shown in FIGS. 1A and 1B. In this example implementation, the PDM encoding is performed using a Class D amplifier 210. As described above, a Class D audio amplifier is a switching amplifier having an output that is either fully on or fully off. When implemented using CMOS transistor, power consumption of the amplification is significantly reduced in comparison to linear amplifier of the same output level because power is not consumed when the switching amplifier is in the fully on or fully off state, but is only consumed when switching between the two. In addition, the Class D amplifier does not generate as much heat as a linear amplifier.

This example implementation is also directed toward the transmission of differential signals. The amplifier circuit is configured to convert a data signal 220 into first and second PDM encoded signals 222 and 224. Low-pass filters 212 and 214 are configured to filter the high frequency components of first and second PDM encoded signals 222 and 224 to produce first and second differential components 226 and 228 of the amplified data signal, which is transmitted by the coupling circuit 218 over the power distribution lines 230 and 232.

As an illustrative example, a data-encoded sine wave having a frequency range (e.g., from 2 KHz to 20 KHz) may be input to the Class D amplifier 210 that is used to perform PDM encoding of data symbols. The Class D amplifier converts the data encoded sine wave to two PDM pulse streams 222 and 224, e.g., in an H-bridge configuration. The PDM pulse streams have a sampling rate that is higher than the frequency of the data encoded signal. For example, each of the two PDM pulse streams 222 and 224 may be 200 KHz signals. Each PDM signal is passed through a low-pass filter to remove the 200 KHz component and produce the differential signal 226 and 228, which is an amplified version of the input sine wave 220. As described with reference to FIG. 1A, the amplified sine wave signal is coupled to the power line through a coupling network including, e.g., a series capacitor on the primary side of a transformer and a series capacitor on the secondary (line) side of the transformer. The transformer-capacitor network of the coupling circuit 218 provides a signal path for the 2 KHz-20 KHz signal while blocking the 60 Hz power line frequency to prevent damage to the low-pass filters 212 and 214 or amplifier 210.

Figure 3:
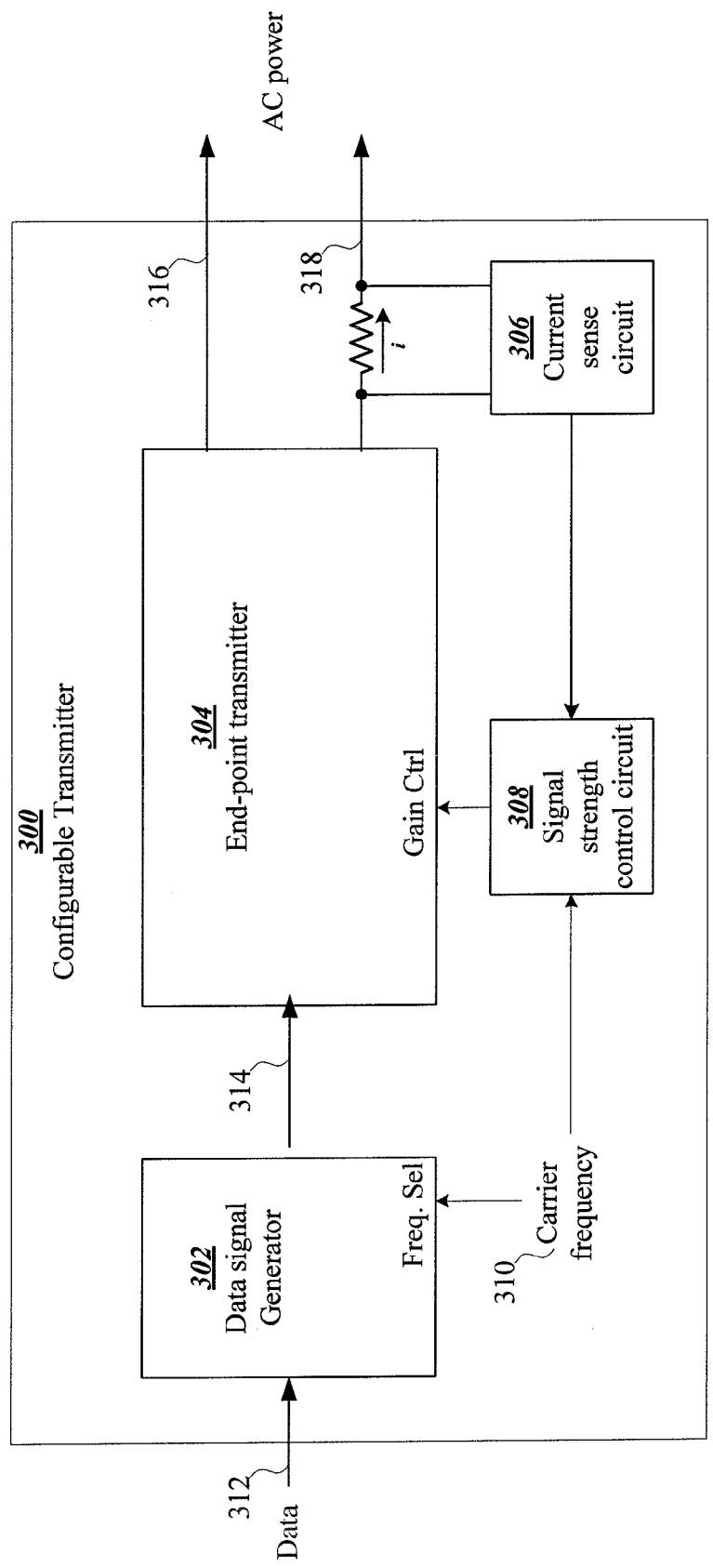
FIG. 3 is a block diagram of the endpoint transceiver circuit shown in FIG. 2 adapted for automatic gain configuration, consistent with one or more embodiments of the present disclosure.

FIG. 3 is a block diagram of the endpoint transceiver circuit shown in FIG. 2 adapted for automatic gain configuration in accordance with one or more embodiments. In some implementations, the transmitter may be configurable to use different frequencies bands for different data channels of the endpoints. However, impedance characteristics of the transmitter and load may vary across different frequencies. This change in impedance may result in unintended increases/decreases in the amplitude of transmitted signals. If the amplitude at which the data is transmitted by endpoints is too low, the collector may not receive the data that is transmitted by the endpoint devices. However, if the amplitude of the transmitted signal is too high, the data transmission may interfere with transmission of data by other endpoints on neighboring communication channels. One or more embodiments may configure signal strength settings of the configurable transmitter 300 to counter changes in amplitude when switching frequency bands used for transmission. In one or more embodiments, the signal strength of a signal may be adjusted, as shown here, by adjusting a signal strength setting (e.g., a gain) of the end-point transmitter 304. In some embodiments, the data signal generator 302 may be configured to also adjust the signal strength of signal 314, in response to the signal level control circuit 308, which may be also used to adjust the signal strength of the configurable transmitter. For instance, in one implementation, the signal level control circuit 308 may be configured to perform fine tuning adjustment of signal strength using the data signal generator and perform coarse tuning adjustment of signal strength using the end-point transmitter 304.

The configurable transmitter 300 includes a data signal generator circuit 302 configured to select an indicated carrier frequency band 310, and encode input data 312 using the selected carrier frequency, to produce date encoded signal 314. The data encoded signal is amplified and transmitted using a transmitter 304, which may be implemented similar to the transmitter shown in FIG. 2. A current sense circuit 306 measures a current output from the transmitter 304 to the power distribution lines 316 and 318. A signal level control circuit 308 adjusts the signal strength increase of the transmitter 304 as a function of the carrier frequency and the sensed output current.

Figure 4:
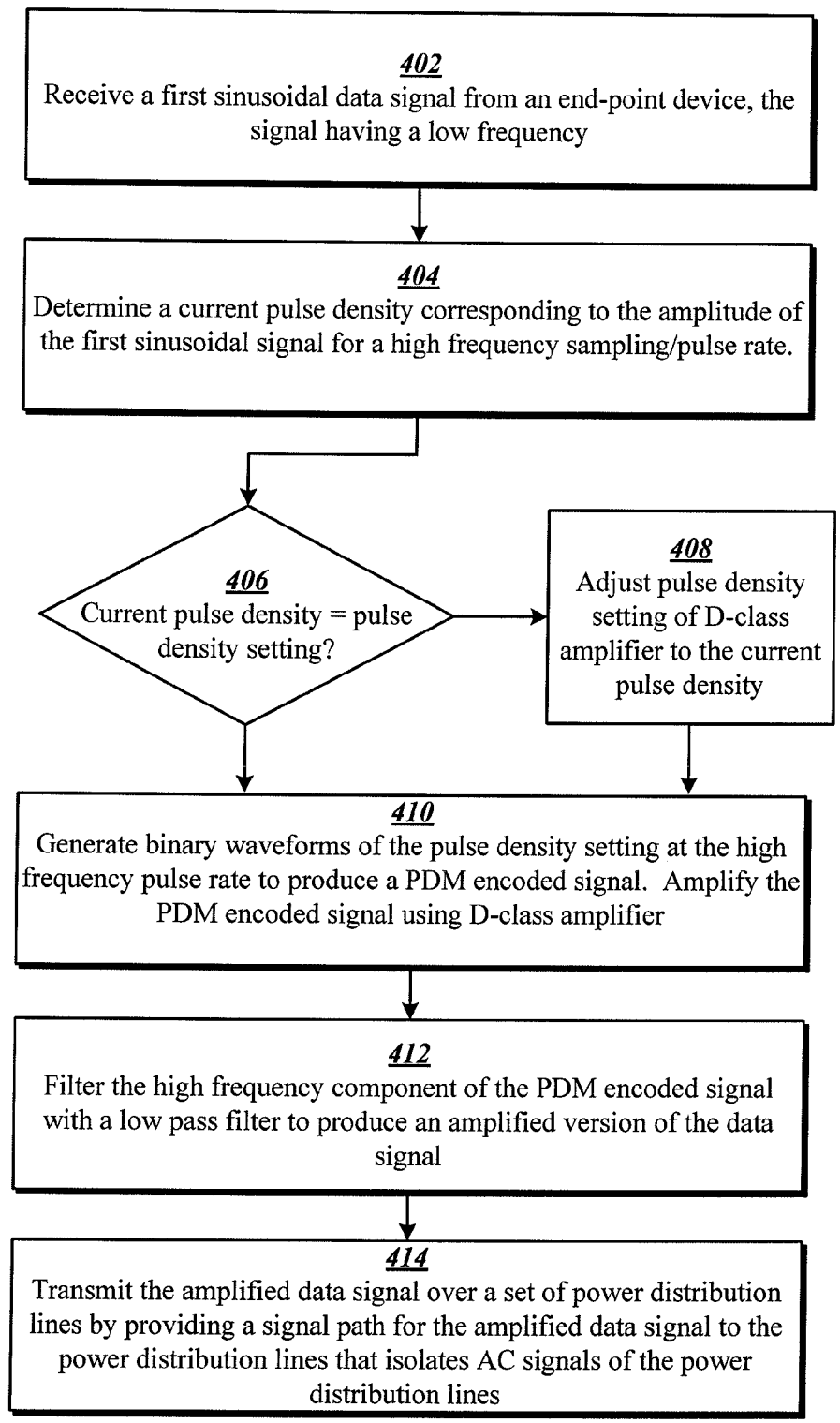
FIG. 4 shows a flowchart of a method for transmitting data over power distribution lines, consistent with one or more embodiments of the present disclosure.

FIG. 4 shows a flowchart of a method for transmitting data over power distribution lines in accordance with one or more embodiments. A low frequency data signal from an endpoint device is received by a transmitter at block 402. A pulse density is determined for the data signal at block 404 using a high sampling/pulse rate. If the determined pulse density is not equal to the current pulse density setting of the amplifier at decision block 406, the pulse density setting of the Class D amplifier is adjusted at block 408 to the determined pulse density. Binary waveforms of the pulse density setting are generated using the Class D amplifier at block 410. The determination of pulse density may, for instance, be determined by comparing the data signal to a triangle wave having a frequency equal to the sampling/pulse rate to determine whether the signal is greater than or less than the triangle wave. Binary output generated by the comparison may then be used to drive a Class D amplifier that can efficiently increase the amplitude of the binary output.

High frequency components of the amplified PDM encoded signal are filtered at block 412, as described above, to produce an amplified version of the data signal. The amplified data signal is communicated to a set of power distribution lines using a signal path at block 414 for transmission of the amplified data signal over the power distribution lines. As described above, the signal path is configured to filter the frequency of AC signals of the power distribution lines and prevent high voltages present on the power distribution lines from damaging the transmitter circuitry used to perform the steps in blocks 402 through 412.

The signals and associated logic and functionality described in connection with the figures can be implemented in a number of different manners. Unless otherwise indicated, various general-purpose systems and/or logic circuitry may be used with programs in accordance with the teachings herein, or it may prove convenient to construct a more specialized apparatus to perform the required method. For instance, according to the present disclosure, one or more of the methods can be implemented in hard-wired circuitry by programming a general-purpose processor, other fully or semi-programmable logic circuitry, and/or by a combination of such hardware and a general-purpose processor configured with software. Accordingly, the various components and processes shown in the figures can be implemented in a variety of circuit-based forms, such as through the use of data processing circuit modules.

It is recognized that aspects of the disclosure can be practiced with computer/processor-based system configurations other than those expressly described herein. The required structure for a variety of these systems and circuits would be apparent from the intended application and the above description.

The various terms and techniques are used by those knowledgeable in the art to describe aspects relating to one or more of communications, protocols, applications, implementations, and mechanisms. One such technique is the description of an implementation of a technique expressed in terms of an algorithm or mathematical expression. While such techniques may be implemented, for instance, by executing code on a computer, the expression of that technique may be conveyed and communicated as a formula, algorithm, or mathematical expression.

For instance, a block denoting "C=A+B" as an additive function implemented in hardware and/or software would take two inputs (A and B) and produce a summation output (C), such as in combinatorial logic circuitry. Thus, the use of formula, algorithm, or mathematical expression as descriptions is to be understood as having a physical embodiment in at least hardware (such as a processor in which the techniques of the present disclosure may be practiced as well as implemented as an embodiment).

In certain embodiments, machine-executable instructions are stored for execution in a manner consistent with one or more of the methods of the present disclosure. The instructions can be used to cause a general-purpose or special-purpose processor that is programmed with the instructions to perform the steps of the methods. The steps may be performed by specific hardware components that contain hardwired logic for performing the steps, or by any combination of programmed computer components and custom hardware components.

In some embodiments, aspects of the present disclosure may be provided as a computer program product, which may include a machine or computer-readable medium having stored thereon instructions, which may be used to program a computer (or other electronic devices) to perform a process according to the present disclosure. Accordingly, the computer-readable medium includes any type of media/machine-readable medium suitable for storing electronic instructions.

The various embodiments described above are provided by way of illustration and should not be construed to necessarily limit the disclosure. Based on the above discussion and illustrations, those skilled in the art will readily recognize that the embodiments may be applicable to a number of applications involving data transmission over power distribution lines. Various modifications and changes may be made without strictly following the exemplary embodiments and applications illustrated and described herein. For instance, such changes may include variations on mechanisms for synchronization with (and/or tracking of) the AC line frequency. Such modifications and changes do not depart from the true spirit and scope of the present disclosure, including aspects set forth in the following claims.

What is claimed is:

1. A transmitter circuit configured and arranged to communicate over power distribution lines that carry power using alternating current (AC) that operates at a power-line frequency, the transmitter circuit comprising:
an amplifier circuit configured and arranged to:
receive a first data signal in the form of a carrier wave that is modulated to represent data bits; and
convert the first data signal to a pulse density modulation (PDM) encoded signal using high frequency pulses that introduce high frequency components;
a low-pass filter configured and arranged to filter the high frequency components of the PDM encoded signal to produce a second data signal, such that the second data signal is an amplification of the first data signal; and
a coupling circuit configured and arranged to communicatively couple the second data signal from the low-pass filter to the power distribution lines and to filter the power-line frequency.

2. The transmitter of claim 1, wherein:
the second data signal is a differential signal having a first differential component and a second differential component;
the amplifier circuit is configured to convert the first signal into a first PDM encoded signal and a second PDM encoded signal; and
the low-pass filter is configured and arranged to filter high frequency components of the first and second PDM encoded signals to produce the respective first and second differential components of the second data signal.

3. The transmitter circuit of claim 1, wherein the second data signal has a frequency and a phase that are the same as a frequency and phase of the first data signal, and has a greater amplitude than the first data signal.

4. The transmitter circuit of claim 1, wherein the PDM encoded signal is encoded using a pulse rate frequency that is greater than a frequency of the first data signal.

5. The transmitter circuit of claim 4, wherein:
the pulse rate frequency is greater than or equal to 300 KHz; and
the first data signal has a frequency less than or equal to 20 KHz.

6. The transmitter circuit of claim 5, wherein the first data signal has a frequency greater than 2 KHz.

7. The transmitter circuit of claim 1, wherein the amplifier circuit is a Class D amplifier.

8. The transmitter circuit of claim 1, wherein the coupling circuit includes:
a transformer;
a first series capacitor coupled to a primary winding of the transformer; and
a second series capacitor coupled to a secondary winding of the transformer.

9. The transmitter circuit of claim 1, wherein the first data signal is a phase-shift encoded data signal.

10. The transmitter circuit of claim 1, wherein the PDM encoded signal is encoded using pulse width modulation.

11. The transmitter circuit of claim 1, further including:
a data signal generation circuit configured and adapted to:
select one of a plurality of carrier frequencies; and
modulate a carrier signal, having the selected one of the plurality of carrier frequencies, to encode data bits to produce the first data signal;
a current sensing circuit configured and arranged to sense current provided to the power distribution lines by the coupling circuit; and
a feedback circuit configured and arranged to:
adjust a gain of the amplifier circuit as a function of the sensed current and the selected one of the plurality of carrier frequencies.

12. The transmitter of claim 11, wherein the feedback circuit is configured and arranged to adjust the gain of the amplifier circuit by performing the steps including:
setting the gain of the amplifier circuit to a lowest gain setting of the amplifier circuit; and
in response to the sensed current being less than a reference current, increasing the gain of the amplifier circuit.

13. The transmitter of claim 11, wherein the feedback circuit is configured and arranged to adjust the gain of the amplifier circuit in response to changes in load impedance, after setting the gain of the amplifier circuit.

14. A method for communicating data over power distribution lines that carry power using alternating current (AC) that operates at a power-line frequency, the method comprising:
  using a processing circuit configured and arranged to amplify a first data signal by performing operations including:
    converting the first data signal to a pulse density modulation (PDM) encoded signal; and
    filtering high frequency components of the PDM encoded signal to produce a second data signal, the second data signal being an amplification of the first data signal;
  communicating the second data signal from the processing circuit to the power distribution lines;
  filtering the power-line frequency between the power distribution lines and the processing circuit;
  selecting one of a plurality of carrier frequencies;
  modulating a carrier signal, having the selected one of the plurality of carrier frequencies, to encode data bits to produce the first data signal;
  sensing current provided to the power distribution lines by the second data signal; and
  adjusting a gain of the amplification of the first data signal as a function of the sensed current and the selected one of the plurality of carrier frequencies.

15. A method for communicating data over power distribution lines that carry power using alternating current (AC) that operates at a power-line frequency, the method comprising:
  using a processing circuit configured and arranged to amplify a first data signal by performing operations including:
    converting the first data signal to a pulse density modulation (PDM) encoded signal; and
    filtering high frequency components of the PDM encoded signal to produce a second data signal, the second data signal being an amplification of the first data signal;
  communicating the second data signal from the processing circuit to the power distribution lines; and
  filtering the power-line frequency between the power distribution lines and the processing circuit, wherein:
  the second data signal is a differential signal having a first differential component and a second differential component; and
  the processing circuit is configured to:
    convert the first signal into a first PDM encoded signal and a second PDM encoded signal; and
    filter high frequency components of the first and second PDM encoded signals to produce the respective first and second differential components of the second data signal.

16. The method of claim 14, wherein the PDM encoded signal is encoded using a pulse rate frequency that is greater than a frequency of the first data signal.

17. The method of claim 16, wherein:
  the pulse rate frequency is greater than or equal to 200 KHz; and
  the first data signal has a frequency less than or equal to 20 KHz.

18. The method of claim 17, wherein the first data signal has a frequency greater than 2 KHz.

19. The method of claim 14, wherein the converting the first data signal to the PDM encoded signal includes processing the first data signal with a Class D amplifier.

20. An apparatus including:
  the transmitter circuit of claim 1, and
  a collector circuit connected to a command center of a power line communication network, and configured and arranged to receive the second data signal from the transmitter circuit over the power distribution lines.

21. The apparatus of claim 20, wherein the first data signal is associated with power meter information.

22. The apparatus of claim 20, further including a command center of a power line communication network.

* * * * *